United States Patent [19]

Silver et al.

[11] 3,926,513

[45] Dec. 16, 1975

[54] BIDIRECTIONAL WEB MEDIUM DRIVE

[75] Inventors: Edward S. Silver, Hackensack; Robert E. Tucker, Passaic, both of N.J.

[73] Assignee: Computer Specialties Corporation, Hackensack, N.J.

[22] Filed: May 9, 1974

[21] Appl. No.: 468,353

[52] U.S. Cl. .................... 353/26; 353/25; 318/7; 318/9
[51] Int. Cl.² .. G03B 23/12; H02P 7/68; H02P 7/00
[58] Field of Search .......... 353/26, 25, 27; 352/168, 352/170, 173, 174, 178, 180, 129, 124; 318/6, 9, 14, 7, 94, 312, 326, 463

[56] References Cited
UNITED STATES PATENTS

| | | | |
|---|---|---|---|
| 3,295,040 | 12/1966 | Schieman............................ | 318/326 |
| 3,459,472 | 8/1969 | Husted et al........................ | 352/173 |
| 3,730,616 | 5/1973 | Fliesser............................... | 352/168 |

Primary Examiner—Richard E. Aegerter
Assistant Examiner—Larry Jones
Attorney, Agent, or Firm—Allison C. Collard

[57] ABSTRACT

A bidirectional web medium drive for moving a web of material such as a roll of microfilm between two reels consisting of a pair of reversible motors coupled through irreversible drives to corresponding spindles which receive and support each of the film reels. A torque controller is coupled to one of the motors for applying a constant output torque to that motor while a variable speed controller is coupled to the other motor for controlling the output speed of that motor. In one embodiment, a switch is provided so that when the switch is in a first position, the torque controller is connected to one of the motors to apply a constant torque to its spindle so that its associated reel becomes the take-up reel while the speed controller is connected to the other motor so that its reel becomes the supply reel and both motors rotate in the same direction. When the switch is thrown into a second position, the outputs of the torque controller and speed controller are interchanged with respect to the motors, and the polarity of the motors is reversed so that the film moves in the opposite direction and the function of the reels are interchanged. In another embodiment, the switch is eliminated so that the motors are directly connected to the controllers and the speed controller is converted to a torque controller while the torque controller is converted to a speed controller and the polarity applied to the inputs of the motors is reversed so that the supply and take-up functions can be reversed.

9 Claims, 5 Drawing Figures

BIDIRECTIONAL WEB MEDIUM DRIVE

This invention relates to a bidirectional drive apparatus for transporting a web of material between a supply and takeup reel.

More specifically, this invention relates to a bidirectional drive apparatus particularly suitable for the inspection of a web of film such as microfiche film, in which a sufficient tension is maintained on the film while the drive apparatus is in operation.

Microfiche is a form of condensed microfilm in which many micro-photographic images of pages of information are arranged in vertical and horizontal rows on what is called a fiche or card. A typical 4 × 6 inch fiche may have several hundred images, each representing one page of information. Microfiche is generally produced in 200-foot reels on photographic equipment and then inspected by using a light table without magnification to locate format errors. It is duplicated, cut, and inspected on microfiche readers for data errors.

In the prior art, devices which are used for inspecting individual microfiche for format errors using a light table have severe limitations. The process is slow and limited by the lack of any magnification. Inspection for data errors on a reader is limited to one frame at a time, and the user has to perform many mechanical motions in order to cover the entire fiche efficiently.

The present invention provides a method and apparatus for inspecting microfiche while it is still in roll form before it is cut into individual fiche. The invention permits fiche to be scanned for field and format errors at an increased magnification. The image may be stopped at any point in the roll or may be reversed in order to go back for a closer inspection.

The roll of film is placed onto either reel spindle of the bidirectional drive so that the film leader can be connected to takeup reel positioned on the other reel spindle. The film between the reels is inserted into the throat of the projector. The reels are then driven so as to move the film web through the projector so that the image can be magnified and observed on a reverse screen.

The spindles which receive both reels are each connected to an irreversible drive such as a worm gear box, so that the spindles cannot be rotated unless the input to each of the gear boxes is driven. Connected to the input of each of the irreversible drive means is a reversible motor such as a DC motor which preferably has a tachometer coupled to the free end of its drive shaft. Each of the motors is connected to a control panel which controls both the speed and torque of the motors while the operator inspects the film. The motor coupled to the takeup reel is connected to a torque controller which is preset so that a constant torque can be applied to the film web regardless of the speed of the reel. The supply reel is connected to a speed controller so that the operator of the apparatus can adjust the speed of the film web while the motor connected to the takeup reel maintains a constant torque and therefore a sufficient tension on the film web. Several idler rollers are provided between the supply and takeup reels so that the film web can be maintained in tension across the optical axis of the projector without requiring additional drive rollers, capstans, or platens to flatten the film.

During the inspection of the film web, both film reels move in the same direction while the film is being held in tension. When the film is to be reversed, the operator switches the functions of the DC motors connected to the supply and takeup reels so that constant torque is then applied to the supply reel while the speed controller is connected to the takeup reel and the film is rewound back onto the supply reel. Since the bidirectional drive apparatus does not require the use of capstans or pinch rollers, the idler rollers, pivotably disposed between the film reels, contact only the back of the film and do not touch the emulsion side as the film is moved across the optical axis of the projector.

It is therefore an object according to the present invention to provide a drive apparatus for moving webs of material, such as film, which simultaneously applies a constant torque to the film web while it is stopped or in motion, when the film is disposed between a pair of reels, and permits the reels to be operated at a variable speed in either direction.

It is another object of the present invention to provide a microfilm drive apparatus which maintains a web of film in tension across the optical axis of a projector without contacting the emulsion side of the film.

It is a further object of the present invention to provide a bidirectional microfilm drive which is simple in design, easy to manufacture and reliable in operation.

Other objects and features of the present invention will become apparent from the following detailed description considered in connection with the accompanying drawings which disclose the embodiments of the invention. It is to be understood, however, that the drawings are designed for the purpose of illustration only and not as a definition of the limits of the invention.

In the drawings wherein similar reference characters denote similar elements throughout the several views.

Figure 1:
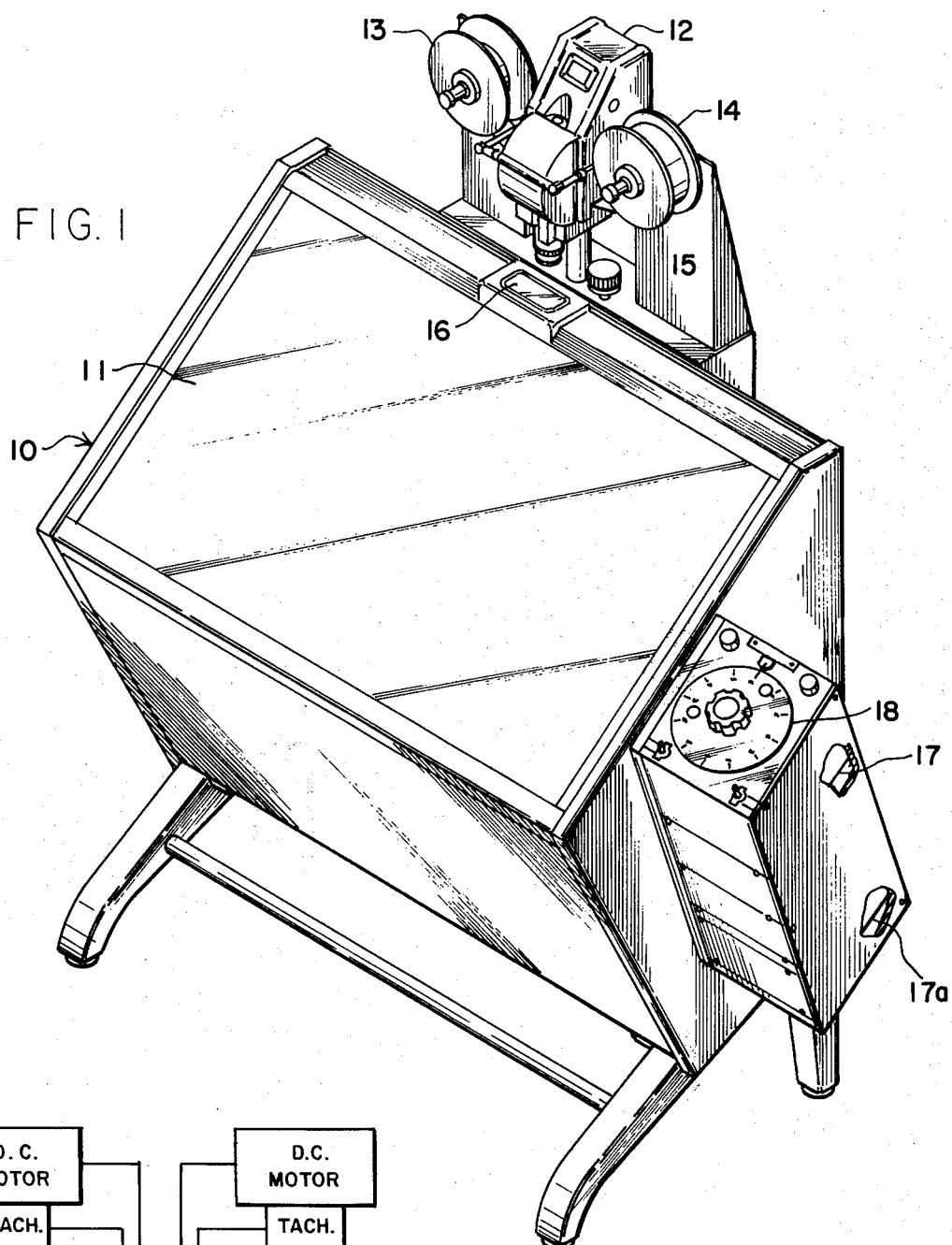
FIG. 1 is a perspective view of the microfilm inspection apparatus including the bidirectional film drive according to the invention.

Referring to FIG. 1 there is shown the microfiche inspection apparatus 10 having a tilted screen 11 onto which the image is projected by projector 12. Film reels 13 and 14 which contain a roll of microfiche images permits the film to pass through the throat of the projector 12 so that the image can be projected through opening 16 for reflection onto screen 11. A controller 17 is provided preferably at the side of the inspection apparatus and includes a speed control dial 18, and a switch for reversing the direction of the reels when the reels are at rest.

Figure 2:
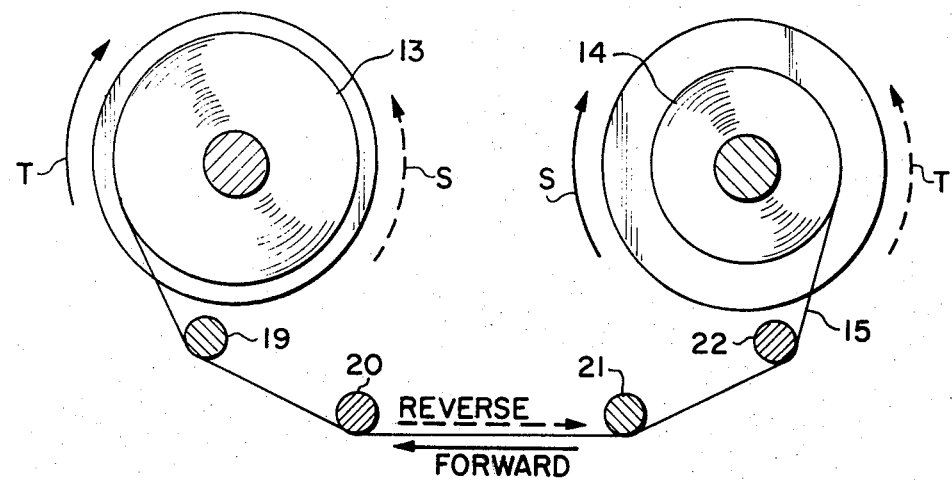
FIG. 2 is a mechanical schematic diagram of the operation of the film web between takeup and supply reels.

FIG. 2 illustrates the path of the film between the supply and takeup reels in either a forward or reverse direction. In the forward direction of movement as shown by the solid line arrow, reel 14 becomes the supply reel so that the film 15 is guided over idler rollers 22, 21, 20 and 19 into takeup reel 13. Idler rollers 20 and 21 are fixed and spaced apart across the optical axis of projector 12 so that when the web of film 15 is held in tension; the portion between the rollers 20 and 21 is held optically flat so that the images on the film can be projected without distortion. Since rollers 19–22 come into contact with only the back side of the film, the emulsion side of the film does not contact any portion of the drive system. In the drive system of the invention, reels 13 and 14 rotate in the same direction with respect to each other when the film is being moved in the forward or reverse direction.

Figure 3:
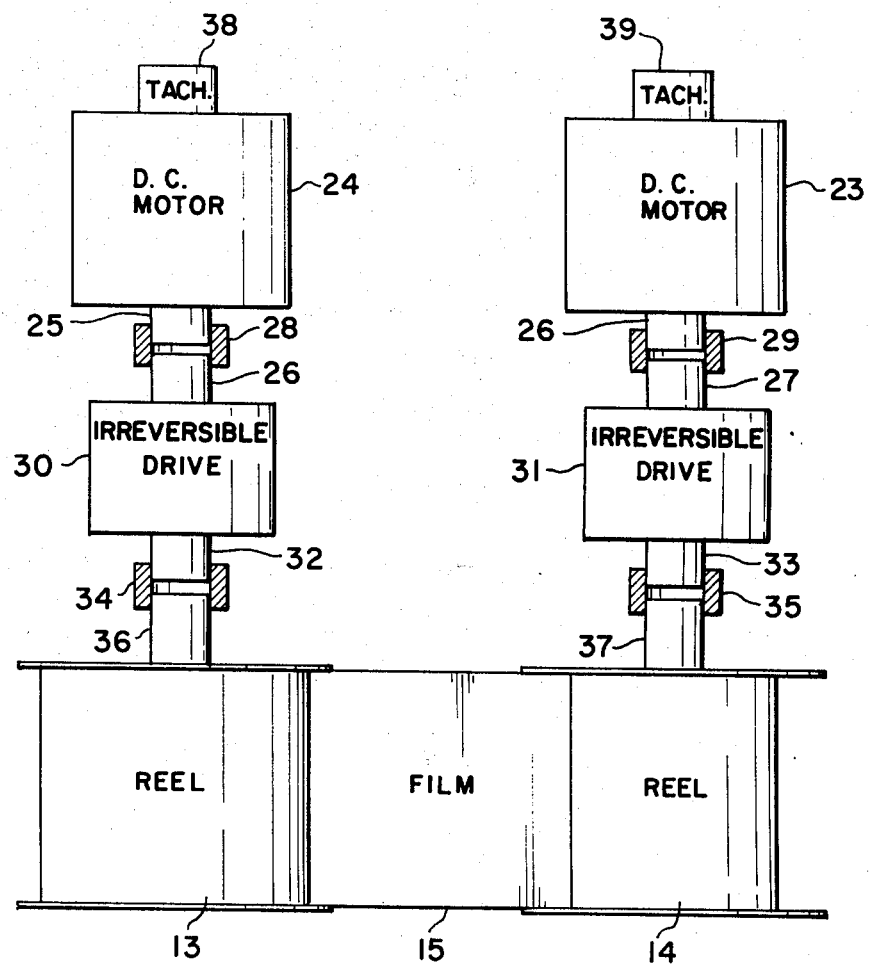
FIG. 3 is a plan view of the mechanical drive.

FIG. 3 illustrates in a plan view the motor drive system for reels 13 and 14. The drive system for reel 13 consists of a reversible electric motor and preferably a DC motor 24 having its output shaft 25 connected through coupling 28 to the input shaft 26 of an irreversible drive 30. The output shaft 32 of irreversible drive 30 is connected through coupling 34 to reel spindle 36 which pivotably supports microfilm reel 13. In a similar manner for reel 14, a motor 23 which is preferably identical to motor 24 has its output shaft 26 connected through coupling 29 to the input shaft 27 of an identical irreversible drive 31. The output shaft 33 of irreversible drive 31 is connected through coupling 35 to spindle 37 which pivotably supports reel 14. On the backside of each motor 23 and 24 are preferably connected tachometers 38 and 39 which are capable of providing a DC voltage which is proportional to the speed of rotation of the output shafts of the motor. The DC motors preferably have a hollow rotor design without iron in the rotor so as to reduce limitations in performance caused by inductance, inertia and residual magnetisim. The hollow rotor results in an extremely low electrical time constant so that it is possible to apply current to the hollow rotor DC motor much faster than a conventional motor with its typical high armature inductance. The hollow rotor motor can thus accelerate and decelerate in significantly less time than required for conventional DC motors. In the present invention the motor selected was an Electrocraft Model E-650 MG having one-fifth of a horsepower output with a nominal speed of 2750 RPM. Other types of DC motors having armatures with low inertia inductance could also be used, such as printed circuit DC motors.

The irreversible drives 30 and 31 can be constructed of any mechanical means that permits rotation of the input shaft 26 or 27 while prohibiting any rotation of output shafts 32 and 33 unless the input shafts are driven. While the irreversible drives may consist of brake and clutch type devices and the like, a preferred drive consisting of a gearbox with two worm gear drives and parallel output and input shafts having a total speed reduction of 1/25 were selected. The two worm gear drives for each irreversible drive means 30 and 31 permit the input and output shafts to be parallel. Bearings (not shown) are typically used to support spindles 36 and 37 onto which reels 13 and 14 are mounted. The spindles are preferably keyed in order to accommodate correspondingly formed slots in of the film reels. The keyways and slots thus lock each of the reels to the spindles as is well known in a conventional manner.

Figure 4:
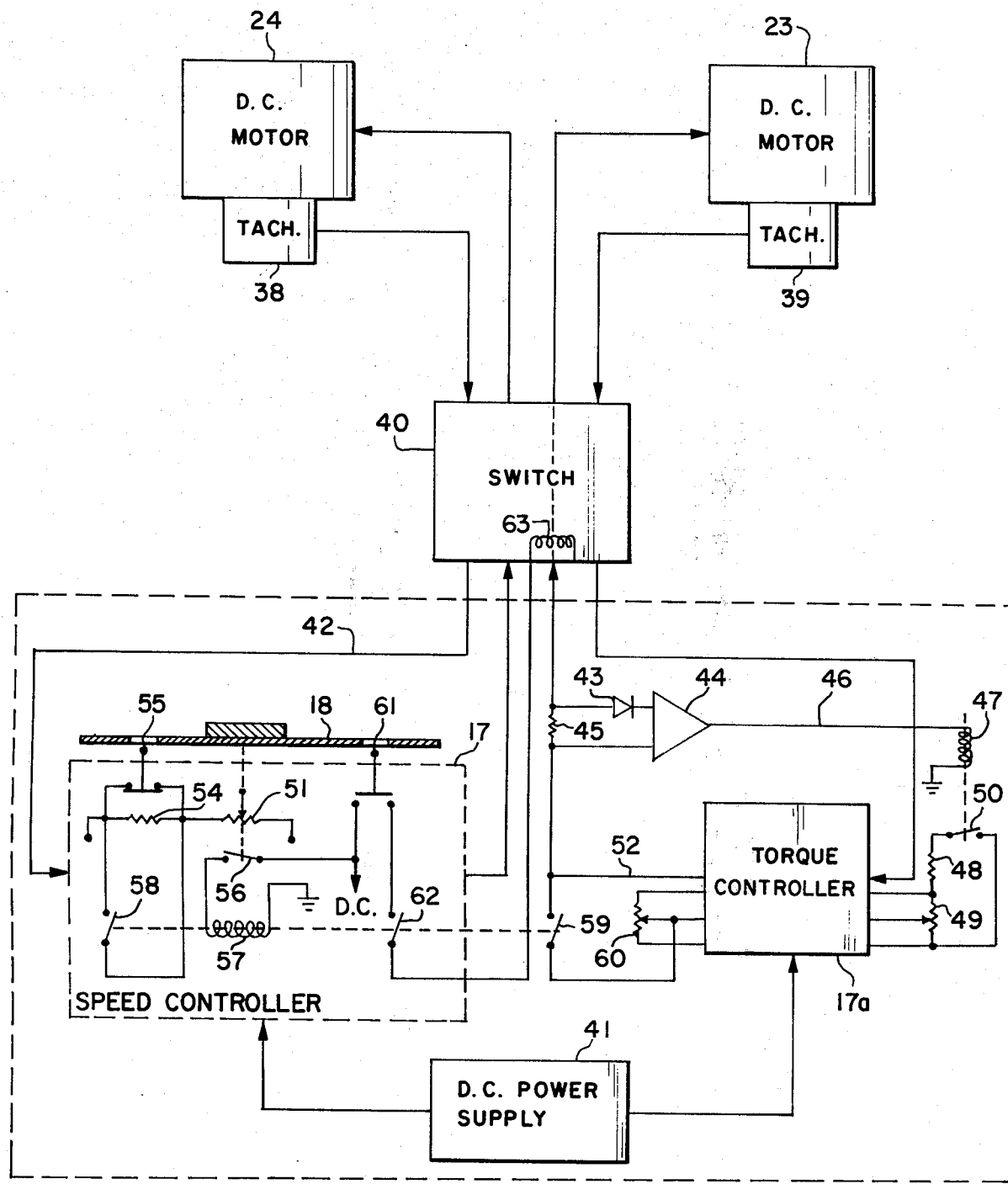
FIG. 4 is an electrical block diagram illustrating the operation of the motor control of the invention.

Referring to FIG. 4 there is shown a partial electrical block diagram of the electrical connections between each of the DC motors and the speed and torque controllers. A multiple pole double throw switch 40 is inserted between the motors and the speed and torque controllers 17 and 17a so that the torque controller can be applied to only one of the DC motors while the speed controller is connected to the other DC motor. When the switch is thrown into a second position when the motors are stopped, the outputs of the torque controller and speed controller are each simultaneously switched to the opposite DC motors and the polarity of the power is reversed so that the motors run in the opposite direction with their speed and torque functions interchanged.

Each of the tachometers 38 and 39 consist of a small DC generator which has an output voltage which is linearlly proportional to the output shaft speed of each motor. When the speed controller is to control the speed of DC motor 24, tachometer 38 is connected through switch 40 to the speed controller via line 42. Speed controller 17 includes a speed control potentiometer 51 connected to dial 18 so that the operator can change the speed of operation of DC motor 24. A semiconductor control circuit maintains a constant speed by sensing tachometer 38. With speed controller 17 connected to motor 24, torque controller 17a is connected to motor 23 and controls the current applied to the armature of motor 23. Torque controller 17a is preset in this embodiment of the invention to apply a constant torque of approximately 10 to 15 inch-pounds to the reel under torque control. This torque remains constant regardless of the speed or direction to which motors 23 and 24 are operating. A conventional electronic circuit is used to monitor the current from DC power supply 41 applied to motor 23 so that the current and therefore the torque can be held constant in order to maintain a constant motor torque and therefore sufficient tension to film web 15.

Both the speed controller 17 and the torque controller 17a are preferably identical electronic control units which were matched to each of the motors. For model E-650 MG motor, manufactured by Electro-Craft Corporation of Hopkins, Minnesota, the control for each motor was manufactured by Minaric Electric Company of Los Angeles, Calif., model TR-902OU. Each motor control unit 17 or 17a is identical in design and construction but contains at least two adjustments to regulate the torque and the speed of each of the motors. In order to make the control system serve as speed controller 17, a potentiometer which controls the armature current and therefore the torque of the motor connected to the speed controller is set to a very low current, just sufficient to overcome the static and dynamic friction of the irreversible drive and the bearings supporting the corresponding spindle.

For the second controller, which is identical in design to controller 17, and used for torque controller 17a, the potentiometer which controls the torque or the magnitude of the armature current of the motor connected to the torque controller is set so that there is approximately 10-15 inch-pounds of torque at the output of the motor. It was found that a torque of this magnitude produces a sufficient tension in the film web to maintain the film web optically flat between rollers 20 and 21 (FIG. 2). In torque controller 17a, the potentiometer 49 which regulates the speed is preset to the maximum speed limit of the DC motor.

In a DC motor, the speed of the motor is generally a function of the voltage applied to the input terminals where for example the motor has a permanent magnet field. Tachometers 38 and 39, which are actually an integral part of Electro-Craft motor E-650 MG produce at their output, a voltage which is proportional to the speed of rotation of DC motors 24 or 23. The semiconductor circuit within controller 17 makes a continuous comparison between the output of tachometers 38 or 39 and the output voltage of speed potentiometer 51 in controller 17 or the corresponding potentiometer 49 in torque controller 17a so that an increasing or decreasing voltage can be applied to the DC motor to adjust its speed in accordance with the setting of potentiometers 51 or 49. For the purposes of simplifying the explanation of this invention, the semiconductor circuits which regulate the speed have not been shown in detail since they are conventional and well known in the art.

When the film web is initially inserted into the projector, there exists a small slack or loop of film before a constant tension can be applied to the film web. With the speed controller set at zero speed, there is a tendency for the torque controller to immediately apply its full torque to the film web. As indicated earlier, the speed potentiometer 49 of the torque controller is set at a maximum speed so that if DC motor 23 "sees" no output torque, the speed of the motor will increase to its maximum RPM at a very high acceleration rate (due to the construction of the hollow core armature) and possibly severely damage the film web as the slack between the reels is suddenly removed. A compensating circuit has therefore been added to the torque controller to monitor the armature current which is fed to DC motor 23 so that at low armature currents and therefore when motor 23 "sees" small output torque or load, the speed of the motor is significantly reduced until the armature current and therefore the output torque can assume their normal magnitude of 10–15 inch-pounds as preset in the torque controller 17a. A current measuring resistor 45 is inserted in series with armature conductor 52 at the output of torque controller 17a. In the preferred embodiment, the resistor consists of a two ohm, ten watt resistor having its output terminals coupled through a diode 43 to the input of an amplifier 44, such as a Darlington type amplifier. At a low armature current input to motor 23, a condition which occurs when the film is slack, the voltage drop across current measuring resistor 45 is negligable and not sufficient to operate relay coil 47 connected to the output of amplifier 44 through conductor 46. Normally closed contact 50 therefore shunts a low resistance 48 across speed control potentiometer 49, of torque controller 17a. Where the speed potentiometer is typically a 50k-ohm potentiometer, and is set at its maximum resistance value to produce a maximum speed, it was found that a shunt resistance of 2K-ohms (resistor 48) was sufficient to reduce the speed of motor 23 so that the motor connected to the take-up reel would turn very slowly until all of the slack was taken out of the film web. As the slack is removed and the film web goes into tension, the armature current to DC motor 23 increases, causing an increase voltage drop across current sensing resistor 45. Amplifier 44 thus produces an increasingly higher output signal until relay 47 actuates and opens contact 50 to remove shunt resistor 48 from the speed control potentiometer 49. The torque controller is then set at the maximum speed by the high resistance setting of speed potentiometer 49. The operator of the microfilm inspection device can then begin inspecting the film web by making adjustments to dial 18 on speed controller 17. While the operator is using the film inspector and the film web is held in tension, it is impossible to remove the film web even if the power is completely removed from both DC motors, since the irreversible drives maintain the film web in tension. It is therefore necessary to provide a slack in the film web to release the tension before the reels can be removed. For this purpose, an additional resistance 54 is added in series with speed potentiometer 51 and shunted by a normally closed release switch 55. The actuating button of release switch 55 is only accessible through an opening in dial 18 when dial 18 is rotated for example counterclockwise past the zero speed position to an "off" position. At the "off" position, a switch 56 mechanically connected to potentiometer 51 opens to remove power from relay coil 57. This opens relay contact 58 which removes a further shunt circuit off resistor 54. Simultaneously with the operation of relay coil 57 closing switch 58, switch 59 which is normally open and connected to torque potentiometer 60 is "closed" to shunt the torque potentiometer and remove the torque from motor 23. With speed potentiometer set at its off or zero resistance setting, the supply reel connected to motor 54 will not move. However, when the operator depresses normally closed release switch 55 through an opening in dial 18, a small additional resistance 54 is added to the speed potentiometer 51 so that the supply motor will rotate slowly to pay off the film web. When the operator releases switch 55, the switch will close across resistance 54 and stop the rotation of DC motor 24. In the actual embodiment of the invention, speed potentiometer 51 is 50K-ohms and resistance 54 is approximately 2K-ohms.

In order to reverse the direction of rotation of the reels, the speed control knob 18 is rotated past zero speed resistance to the "off" position so that switch 56 which is mechanically connected to potentiometer 51 opens to remove power from relay coil 57 as described above. Contact 62 which, similar to contacts 58 and 59 is responsive to relay coil 57, closes so that the contacts of a reverse switch 61 can be coupled to switch coil 63 which operates switch 40. Normally open release switch 61 is also accessible through a second opening in dial 18 when the dial is set to the off position. Therefore, when the operator of the microfilm inspector depresses switch 61, electrical power is applied through closed contacts 62 into switch coil 63 so that the armature winding of DC motor 24 and the output of tachometer 38 are connected to torque controller 17a while the armature of motor 23 and the output of tachometer 39 are connected to speed controller 17. Switch 40 also reverses the electrical polarity applied to motors 23 and 24 through their armature connections so that the motors will now operate in the opposite direction. Torque controller 17a maintains a constant torque by controlling the current applied to the armature of motor 24 while speed controller 17 permits the speed of motor 23 to be varied by changing the setting on potentiometer 51. Since in the preferred embodiment, both the DC motors and tachometers are substantially identical in design, the motors will operate in a manner described with respect to the first position of the switch except in an opposite direction and with their speed control and torque control functions interchanged.

Figure 5:
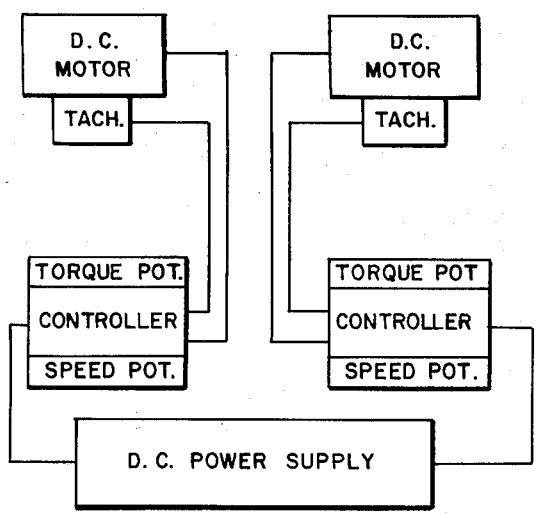
FIG. 5 shows the motor torque art speed control circuitry for the drive motors.

In another embodiment of the invention, it is possible to eliminate switch 40 and reverse the functions of speed controller 17 and torque controller 17a by adjusting their speed control and torque potentiometers respectively as shown in FIG. 5. Since both motor controls are identical in design, speed controller 17 can be changed to a torque controller by setting the speed control potentiometer 51 to its maximum resistance to obtain maximum speed of motor 24 and its corresponding torque control potentiometer (not shown) to provide a desired magnitude of torque of between 15–20 inch-pounds to the film web. In a similar manner, torque controller 17a can be converted to a speed controller by setting its torque control potentiometer 60 to a small value of torque sufficient to overcome the static and dynamic forces necessary to move its irreversible drive, and permit variable adjustment of its speed control potentiometer 49 so that the speed of motor 23 can be varied. The polarity of the DC power supply 41 could then be reversed so that a reverse polarity could be applied to the converted speed controller and torque controller. In this manner, switch 40 has been eliminated by interchanging the functions of the speed and torque controller and reversing the DC power supply. The DC motors will then operate properly as supply and take-up reels maintaining a sufficient tension of the film web to hold the film web optically flat between the idler rollers across the optical axis of the projector.

While only a few embodiments of the present invention are shown and described, it will be obvious that many changes and modifications can be made thereunto without departing from the spirit and scope of the invention.

What is claimed is:

1. A bidirectional web medium drive for moving a web of material between two reels comprising:

first and second reversible motors;

drive means each having an input coupled to the output of each of said motors, and an output which is restricted from rotation unless the input is driven;

first and second spindles each connected to each output of said irreversible drive means, said spindles adapted to receive and support the reels;

a torque controller coupled to one of said motors for maintaining an output torque to that motor;

a variable speed controller coupled to the other of said motors for controlling the output speed of that motor; and switch means coupled to said torque and speed controllers for running said first and second motors in the same direction, said switch means having at least two positions so that when said switch means is in a first position, the torque controller is connected to said first motor to apply a torque to said first spindle causing its associated reel to be the web take-up reel, and the speed controller is connected to said second motor to apply a selected speed to the second spindle causing its associated reel to be the web supply reel, and when said switch means is in a second position, said torque controller is connected to said second motor and said speed controller is connected to said first motor and the direction of rotation of said motors is reversed so that the reel on said first spindle becomes the supply reel and the reel on said second spindle becomes the take-up reel.

2. The web medium drive as recited in claim 1 additionally comprising at least two spaced-apart idler rollers pivotably disposed between the reels for contact with one side of the web so that when a torque is applied to the web by the take-up reel, the web is held substantially planar between said idler rollers.

3. The web medium as recited in claim 1 wherein said torque controller comprises current sensing means coupled to its output, and means responsive to said current sensing means for limiting the speed of said motor coupled to the take-up reel until a desired preset output torque of said motor is reached.

4. The web medium drive as recited in claim 3 wherein said current sensing means comprises a resistor connected in series with the armature of said motor and, an amplifier responsive to the voltage drop across said resistor.

5. The web medium drive as recited in claim 1 comprising release switching means for limiting the output of said torque controller so that the torque of the take-up motor is reduced to zero when the speed set on said speed controller is at zero magnitude, and means for applying a small speed to said speed controller so that its associated supply reel will release the tension on the film web.

6. The web medium drive as recited in claim 5 wherein said means for applying a small speed to said speed controller comprises a resistor connected in series with said variable speed controller, and a normally closed shunt switch connected across said resistor so that the addition of said resistance to said speed controller causes the supply reel to advance.

7. The web medium drive as recited in claim 1 comprising reverse switching means for limiting the output of said torque controller so that the torque of the take-up motor is reduced to zero when the speed set on said speed controller is at zero magnitude, and actuating said switch means coupled to said speed and torque controllers to throw said switch means into its second position.

8. The web medium drive as recited in claim 7 wherein said reverse switching means comprises a switch coupled to said switch means, a relay coil connected to said switch when said switch means is set at an "off" position, and a normally open reverse switch coupled to a power source so that when said reverse switch is depressed, said relay coil is energized to apply said power to said switch means so that said switch means is thrown into its second position.

9. A bidirectional web medium drive for moving a web of material between two reels comprising:

first and second reversible motors;

drive means each having an input coupled to the output of each of said motors, and an output which is restricted from rotation unless the input is driven;

first and second spindles each connected to each output of said irreversible drive means, said spindles adapted to receive and support the reels;

a first controller coupled to said first motor and having a torque function and a variable speed function;

a second controller coupled to said second motor and having a torque function and variable speed function;

so that in a first operating mode, said first controller being adjusted so that its speed function is set at a maximum and its torque function is set to a level so that the reel coupled to said first motor becomes a take-up reel having a torque to maintain the web in tension, and said second controller being adjusted so that its torque function is set to a limited low level and its speed function is variable, so that the reel coupled to said second motor becomes a supply reel under variable speed control, and in a second operating mode, said first controller is adjusted so that its speed function is variable and its torque function is set to a limited low level and said second controller is adjusted so that its speed function is set at a maximum and its torque function is set to a level to maintain the web in tension so that the functions of said supply and take-up reels are interchanged, and means for reversing the direction of rotation of said first and second motors responsive to said second operating mode.

* * * * *